(12) United States Patent
Fraley et al.

(10) Patent No.: US 8,973,406 B2
(45) Date of Patent: Mar. 10, 2015

(54) MELTERS FOR GLASS FORMING APPARATUSES

(71) Applicants: Raymond Eugene Fraley, Waverly, NY (US); Shayne O Manning, Cincinnati, OH (US); Jason Sauers, Horseheads, NY (US)

(72) Inventors: Raymond Eugene Fraley, Waverly, NY (US); Shayne O Manning, Cincinnati, OH (US); Jason Sauers, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 230 days.

(21) Appl. No.: 13/661,732

(22) Filed: Oct. 26, 2012

(65) Prior Publication Data

US 2014/0116095 A1    May 1, 2014

(51) Int. Cl.
  *F27D 1/14*    (2006.01)
  *F27D 1/00*    (2006.01)

(52) U.S. Cl.
  CPC ...... *F27D 1/0003* (2013.01); *F27D 2001/0046* (2013.01)
  USPC .................. 65/336; 65/172; 65/347; 110/181

(58) Field of Classification Search
  CPC .............. F27D 1/0006; F27D 1/0023–1/0026; F27D 1/004; F27D 1/025; F27D 1/10; F27D 1/14–1/148; C03B 5/167–5/1677
  USPC .................................................... 65/335–347
  See application file for complete search history.

(56) References Cited

U.S. PATENT DOCUMENTS

| | | | | |
|---|---|---|---|---|
| 2,029,052 A | * | 1/1936 | Bowen | 432/251 |
| 2,240,361 A | * | 4/1941 | Willetts | 432/238 |
| 2,548,908 A | * | 4/1951 | Pollen | 432/70 |
| 3,819,350 A | | 6/1974 | Pellett et al. | 65/134 |
| 3,840,358 A | | 10/1974 | Whitfield, Jr. | 65/1 |
| 4,381,934 A | | 5/1983 | Kunkle et al. | 65/134 |
| 4,592,770 A | | 6/1986 | Pearman et al. | 65/128 |
| 4,897,103 A | * | 1/1990 | Weilacher | 65/346 |
| 5,002,600 A | * | 3/1991 | Sorg et al. | 65/346 |
| 5,643,350 A | | 7/1997 | Mason et al. | 65/158 |
| 2011/0019712 A1 | * | 1/2011 | Geib | 373/27 |

FOREIGN PATENT DOCUMENTS

| | | |
|---|---|---|
| JP | 2008001538 | 1/2008 |
| JP | 2008001538 A * | 1/2008 |

OTHER PUBLICATIONS

Sakawa JP 2008-001538 machine translation as provided by http://dossier1.ipdl.inpit.go.jp/AIPN/odse_top_fwi.ipdl?N0000=7401 on Aug. 5, 2014.*
PCT—International Application No. @ PCT/US2012/066271—Notification of transmittal of the International Search Report and the Written Opinion of the International Searching Authority or the Declaration—Dated: Jan. 3, 2014.

* cited by examiner

*Primary Examiner* — Jodi C Franklin
(74) *Attorney, Agent, or Firm* — Kevin M. Able

(57) ABSTRACT

Melters for glass forming apparatuses and glass forming apparatuses comprising the same are disclosed. According to one embodiment, a melter for melting glass batch materials includes a base portion and a rigid exoskeleton rigidly attached to the base portion and comprising a plurality of upright members interconnected with a plurality of cross members defining an exoskeleton interior volume. Connection nodes formed at intersections of the plurality of cross members with upper ends of the plurality of upright members are constrained from movement relative to the base portion in a longitudinal direction, a transverse direction, and a vertical direction. A tank assembly is positioned on the base portion in the exoskeleton interior volume and coupled to the rigid exoskeleton. In some embodiments, the melter has a dynamic resistance greater than 0.3.

20 Claims, 9 Drawing Sheets

MELTERS FOR GLASS FORMING APPARATUSES

BACKGROUND

1. Field

The present specification generally relates to glass manufacturing apparatuses and, more specifically, to melters for melting molten glass from glass batch materials and glass manufacturing apparatuses comprising the same.

2. Technical Background

Optical quality glass sheets are commonly employed in a variety of optical display devices including LCD displays, LED displays, and the like. Various manufacturing processes may be used to produce the optical quality glass sheets. These manufacturing processes generally involve melting glass precursor materials in ceramic refractory furnaces, and then producing a ribbon of glass from the glass melt by drawing the glass melt from a forming body. Individual glass sheets are then cut from the ribbon of glass. The ribbon can be extraordinarily thin, and movement of the manufacturing equipment during the drawing process (such as from seismic activity or the like) can disrupt the flatness of the glass ribbon and resultant glass sheets. In more extreme cases, seismic activity may even result in the destruction of the manufacturing apparatus itself, and in particular the melter of the glass manufacturing process.

More specifically, during normal operation, the glass melting furnace (i.e., the melter) contains many thousands of kilograms of molten glass material. Despite the significant strength and stiffness of the refractory blocks from which the melting furnace is constructed, the strength of the melter is not sufficient to resist the acceleration of the melter due to the energy released during seismic episodes. In many cases, accelerations of the melter during seismic episodes may damage the structure of the melter and cause the uncontrolled release of molten glass. Once damaged, rebuilding the melter can take months of time and cost many millions of dollars in capital outlay and lost production.

Accordingly, a glass manufacturing apparatus having a melter configured to withstand seismic episodes would provide significant insurance against such losses and reconstruction costs.

SUMMARY

Described herein are melters for melting glass batch materials which are capable of withstanding dynamic events, such as seismic episodes or the like.

According to one embodiment, a melter for melting glass batch materials capable of withstanding dynamic events may include a rigid exoskeleton having a base portion and a plurality of upright members and a plurality of cross members defining an exoskeleton interior volume. The plurality of upright members may be rigidly attached to the base portion and extend upwards from the base portion in a generally vertical direction. The plurality of cross members may extend between and be rigidly attached to upper ends of at least two of the plurality of upright members such that the plurality of upright members are interconnected by the plurality of cross members and connection nodes formed at intersections of the plurality of cross members with the upper ends of the plurality of upright members are constrained from movement relative to the base portion in a longitudinal direction, a transverse direction, and a vertical direction. A tank assembly may be positioned on the base portion in the exoskeleton interior volume such that the tank assembly is spaced apart from the rigid exoskeleton. The tank assembly may be rigidly coupled to the rigid exoskeleton.

According to another embodiment, a melter for melting glass batch materials capable of withstanding dynamic events may include a rigid exoskeleton defining an exoskeleton interior volume for receiving a tank assembly, the rigid exoskeleton comprising a base portion and a plurality of upright members and a plurality of cross members formed from tubular beams. The plurality of upright members may be rigidly attached to the base portion and may extend upwards from the base portion in a generally vertical direction. The plurality of cross members may extend between and may be rigidly attached to upper ends of at least two of the plurality of upright members such that the plurality of upright members are interconnected by the plurality of cross members and connection nodes formed at intersections of the plurality of cross members with the upper ends of the plurality of upright members are constrained from movement relative to the base portion in a longitudinal direction, a transverse direction, and a vertical direction. A plurality of pressure bolts affixed to the rigid exoskeleton for coupling the tank assembly to the rigid exoskeleton when the tank assembly is positioned in the exoskeleton interior volume. Rollers may be affixed to an underside of the base portion. The rollers may be electrically isolated from the base portion. A motion restraint may be attached to the underside of the base portion for affixing the melter to a building structural member when the melter is in an installed condition.

In yet another embodiment, a melter for melting glass batch materials capable of withstanding dynamic events may include a rigid exoskeleton including a base portion and a plurality of upright members interconnected with a plurality of cross members and the base portion. The rigid exoskeleton may generally define an exoskeleton interior volume. A tank assembly may be positioned on the base portion in the exoskeleton interior volume and coupled to the rigid exoskeleton. The melter may have a dynamic resistance greater than 0.3.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
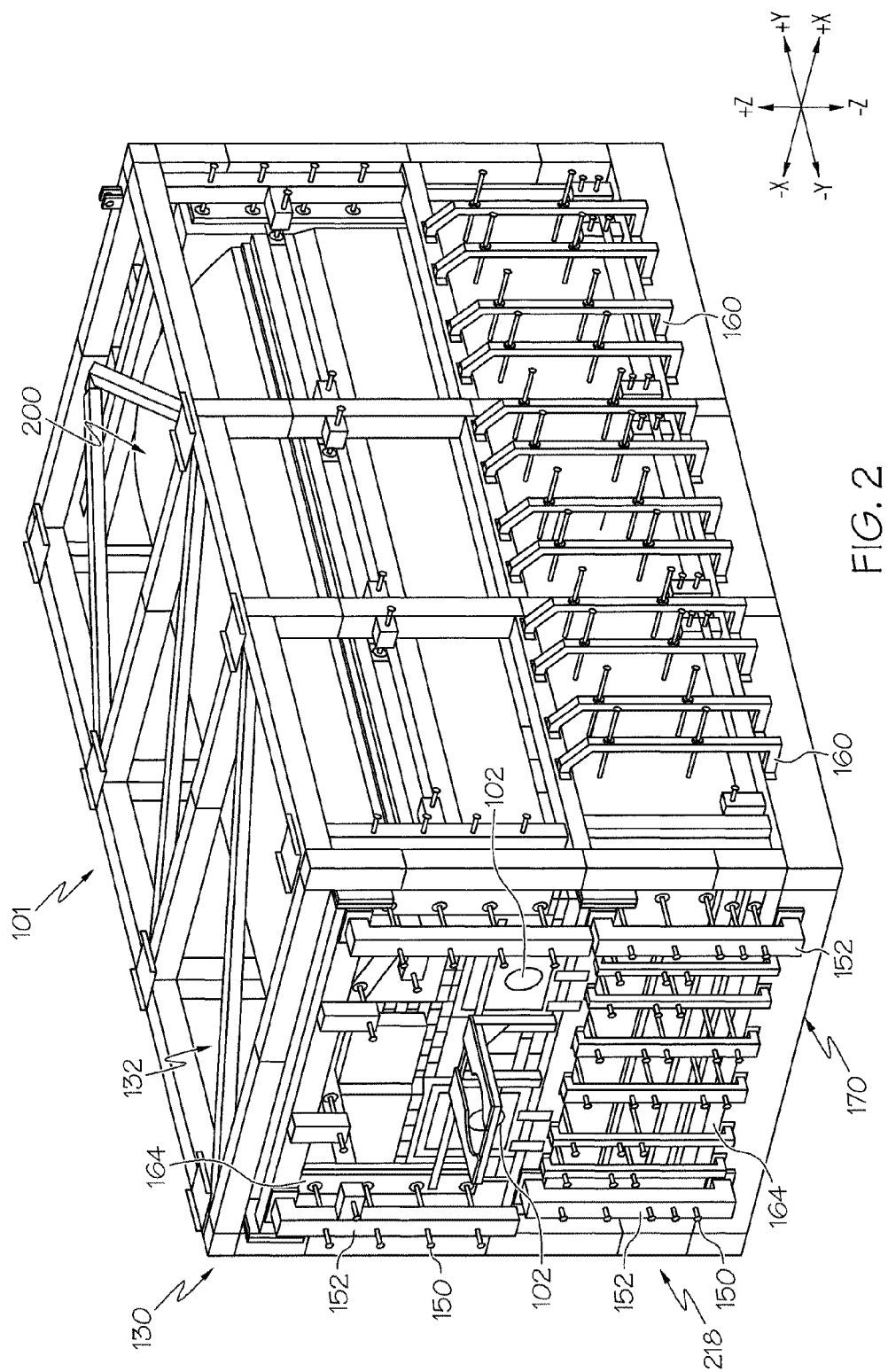
FIG. 2 schematically depicts an isometric rear view of a melter for a glass manufacturing apparatus according to one or more embodiments shown and described herein.

Reference will now be made in detail to embodiments of melters for glass forming apparatuses, examples of which are illustrated in the accompanying drawings. Whenever possible, the same reference numerals will be used throughout the drawings to refer to the same or like parts. One embodiment of a melter is schematically depicted in FIG. 2. The melter generally comprises a rigid exoskeleton with a base portion, a plurality of upright members and a plurality of cross members which are interconnected such that the upright members and the cross members define an exoskeleton interior volume. A tank assembly may be positioned on the base portion in the exoskeleton interior volume such that the tank assembly is spaced apart from the exoskeleton. A plurality of pressure bolts couple the rigid exoskeleton to the tank assembly. In some embodiments, the melter may have a dynamic resistance greater than about 0.3. The melter and various components of the melter will be described in further detail herein with specific reference to the appended drawings.

Glass stock material, such as glass sheets, may generally be formed by melting glass batch materials to form molten glass and forming the molten glass into a final glass product such as a glass ribbon. Exemplary processes include the float glass process, the slot draw process and the fusion downdraw process.

Figure 1:
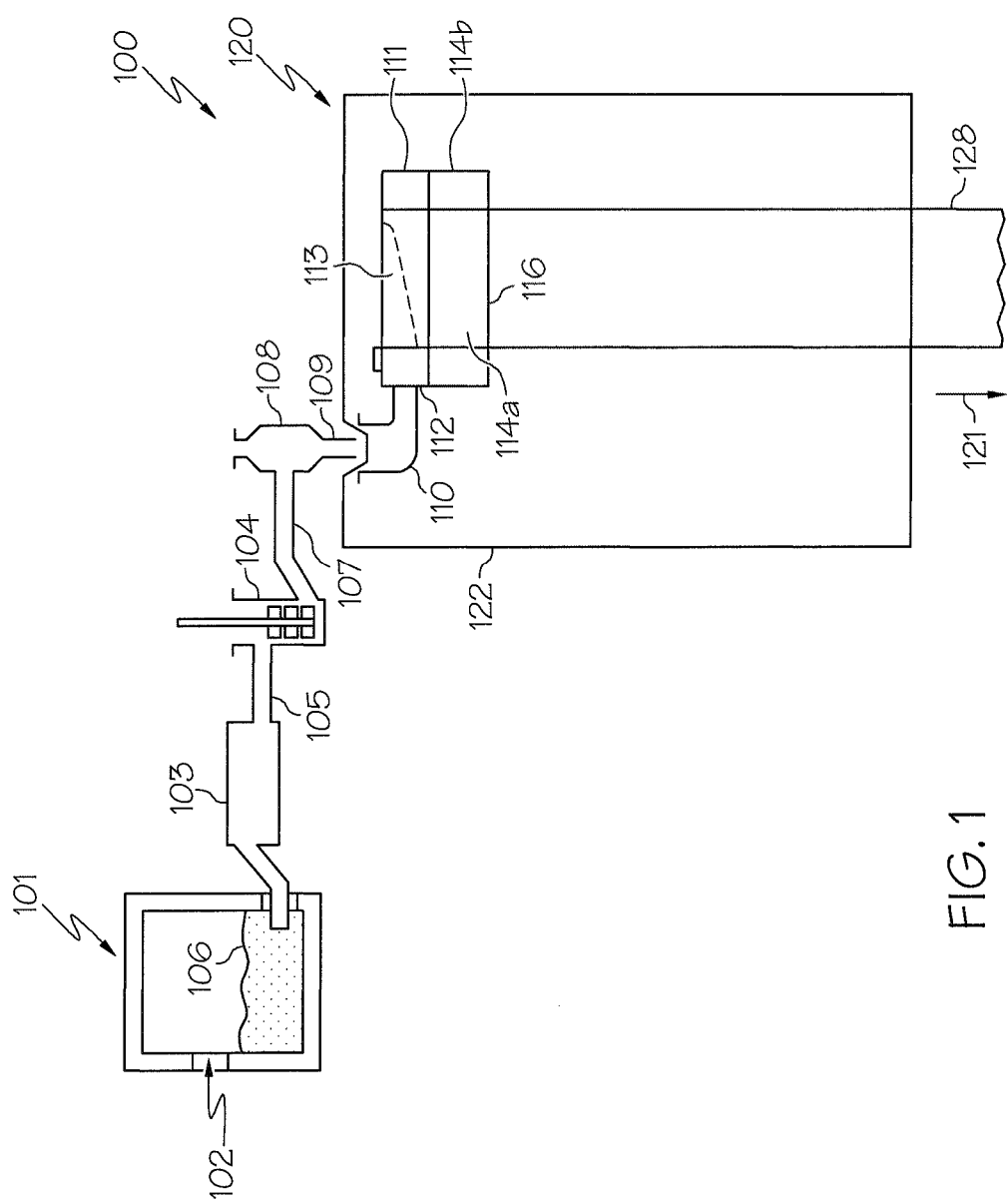
FIG. 1 schematically depicts a glass manufacturing apparatus according to one or more embodiments shown and described herein.

Referring to FIG. 1 by way of example, an exemplary glass manufacturing apparatus 100 for forming glass ribbons from molten glass is schematically depicted in which a fusion draw machine is used to form the molten glass into glass ribbons. The glass manufacturing apparatus 100 includes a melter 101, a fining vessel 103, a mixing vessel 104, a delivery vessel 108, and a fusion draw machine (FDM) 120. Glass batch materials are introduced into the melter 101 through an inlet port 102. The batch materials are melted in the melter to form molten glass 106. The fining vessel 103 has a high temperature processing area that receives the molten glass 106 from the melter 101 and in which bubbles are removed from the molten glass 106. The fining vessel 103 is fluidly coupled to the mixing vessel 104 by a connecting tube 105. That is, molten glass flowing from the fining vessel 103 to the mixing vessel 104 flows through the connecting tube 105. The mixing vessel 104 is, in turn, fluidly coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110 and a forming vessel 111 are positioned. As shown in FIG. 1, the molten glass 106 from the downcomer 109 flows into an inlet 110 which leads to the forming vessel 111. The forming vessel 111 includes an opening 112 that receives the molten glass 106 which flows into a trough 113 and then overflows and runs down two converging sides 114a and 114b before fusing together at a root, where the two sides join, before being contacted and drawn in a downstream direction 121 to form a continuous glass ribbon 148.

While FIG. 1 schematically depicts a glass manufacturing apparatus 100 for forming glass ribbon using a fusion draw machine, it should be understood that other processes may be used to form the glass ribbon, including, without limitation, the float glass process, the slot draw process or the like. Further, while the glass manufacturing apparatus 100 is depicted as being used for forming glass ribbon, it should be understood that similar glass manufacturing apparatuses may be used for forming glass stock material other than glass sheets including, without limitation, glass tubes and the like.

In conventional melter designs, the melter 101 is generally constructed from refractory blocks which, in some cases, may be held together by the shear mass of the refractory blocks and reinforced with external supports. However, such designs have proven inadequate for maintaining the structural integrity of the melter, particularly when the melter is subjected to seismic activity. Specifically, the external supports in conventional melter designs fail to adequately restrain the refractory blocks in each of the longitudinal direction, the transverse direction and the vertical direction. As such, when the melter is subjected to significant seismic activity (i.e., seismic activity which results in accelerations of the melter of greater than 0.3 g in one or more of the transverse direction, the longitudinal direction, and/or the vertical direction) the external supports and masonry refractory of the melter have a tendency to flex, buckle, and/or fail which may cause a breach in the refractory blocks and the uncontrolled escape of molten glass from the melter. Glass escaping from the melter may result in damage to the glass manufacturing apparatus, process downtime, and significant capital losses. The melters in the embodiments shown and described herein mitigate the deficiencies in the aforementioned conventional melter designs.

Figure 3:
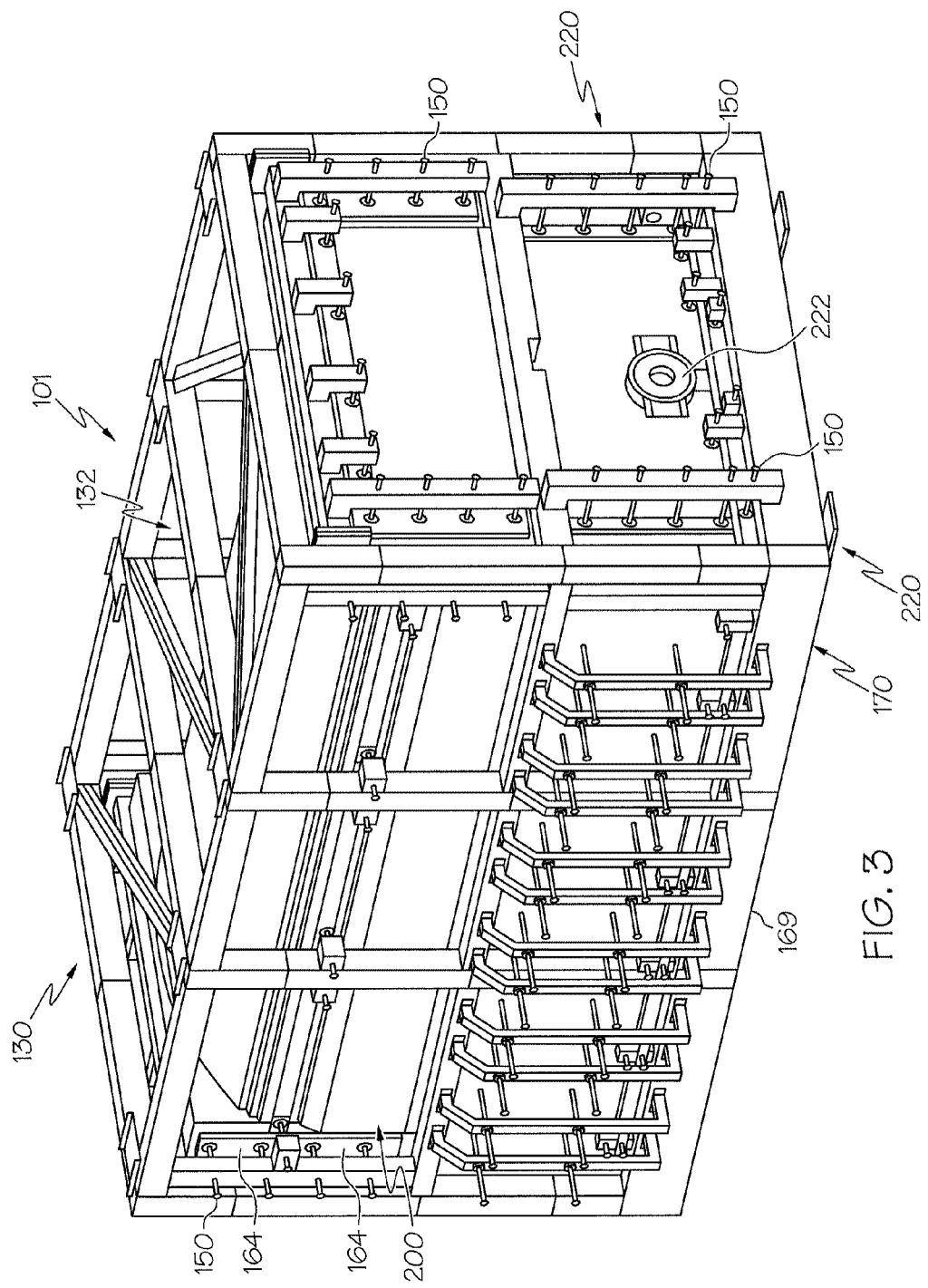
FIG. 3 schematically depicts an isometric front view of a melter for a glass manufacturing apparatus according to one or more embodiments shown and described herein.

Referring now to FIGS. 2 and 3, a melter 101 for use in a glass manufacturing apparatus is schematically depicted from the rear (FIG. 2) and from the front (FIG. 3). The melter 101 comprises a rigid exoskeleton 130 including a base portion 170. The rigid exoskeleton 130 generally defines an exoskeleton interior volume 132. The melter 101 further includes a tank assembly 200 which is supported on the base portion 170 in the exoskeleton interior volume 132. The tank assembly 200 is positioned on the base portion 170 such that the tank assembly 200 is spaced apart from the rigid exoskeleton 130. The tank assembly 200 includes a rear face 218 having a plurality of inlet ports 102 through which glass batch materials may be introduced into the interior of the tank assembly 200 for melting. The tank assembly 200 also has a front face 220 which includes an outlet port 222 through which molten glass issues from the tank assembly. The rigid exoskeleton 130 is coupled to the tank assembly 200 with pressure bolts 150 which, in some embodiments, may be spring-loaded pressure bolts. Specifically, the pressure bolts 150 are positioned in support members, such as c-frames 160 and stanchions 152 which, in turn, are rigidly affixed to the rigid exoskeleton 130.

In the embodiments of the melter 101 described herein, the melter has a strong and ductile resistance to seismic activity and other dynamic events which may compromise the structural integrity of the melter. The resistance of the melter to damage caused by accelerations imparted to the melter by such events may be defined in terms of a dynamic resistance. The dynamic resistance is an indication of the ability of the melter to withstand an applied acceleration of a specified g-acceleration in any of the transverse direction, the longitudinal direction, and the vertical direction without the tank assembly 200 shifting with respect to the rigid exoskeleton 130 and its attached base portion 170. In the embodiment of the melter 101 described herein, the transverse direction is the +/−x directions of the coordinate axes depicted in FIG. 2, the longitudinal direction is the +/−y directions, and the vertical direction is the +/−z directions of the coordinate axes depicted in FIG. 2. In the embodiments of the melter described herein, the melters have a dynamic resistance greater than 0.3. For example, if the melter has a dynamic resistance of greater than 0.3, the melter is capable of withstanding dynamic forces, velocities, and accelerations of greater than 0.3 g in any of the transverse direction, longitudinal direction, and/or vertical direction without the tank assembly 200 shifting with respect to the rigid exoskeleton 130 and the base portion 170. In some embodiments described herein, the melter has a dynamic resistance of greater than or equal to 0.5 (i.e., 0.5 g accelerations) or even greater than or equal to 1.0 (i.e., 1.0 g accelerations). The dynamic resistance of the melter may be assessed by an engineering analysis of a computer model of the of the melter structure. Alternatively, the dynamic resistance of the melter may be assessed by seismic testing of a model (scale or actual size) of the melter.

Figure 4:
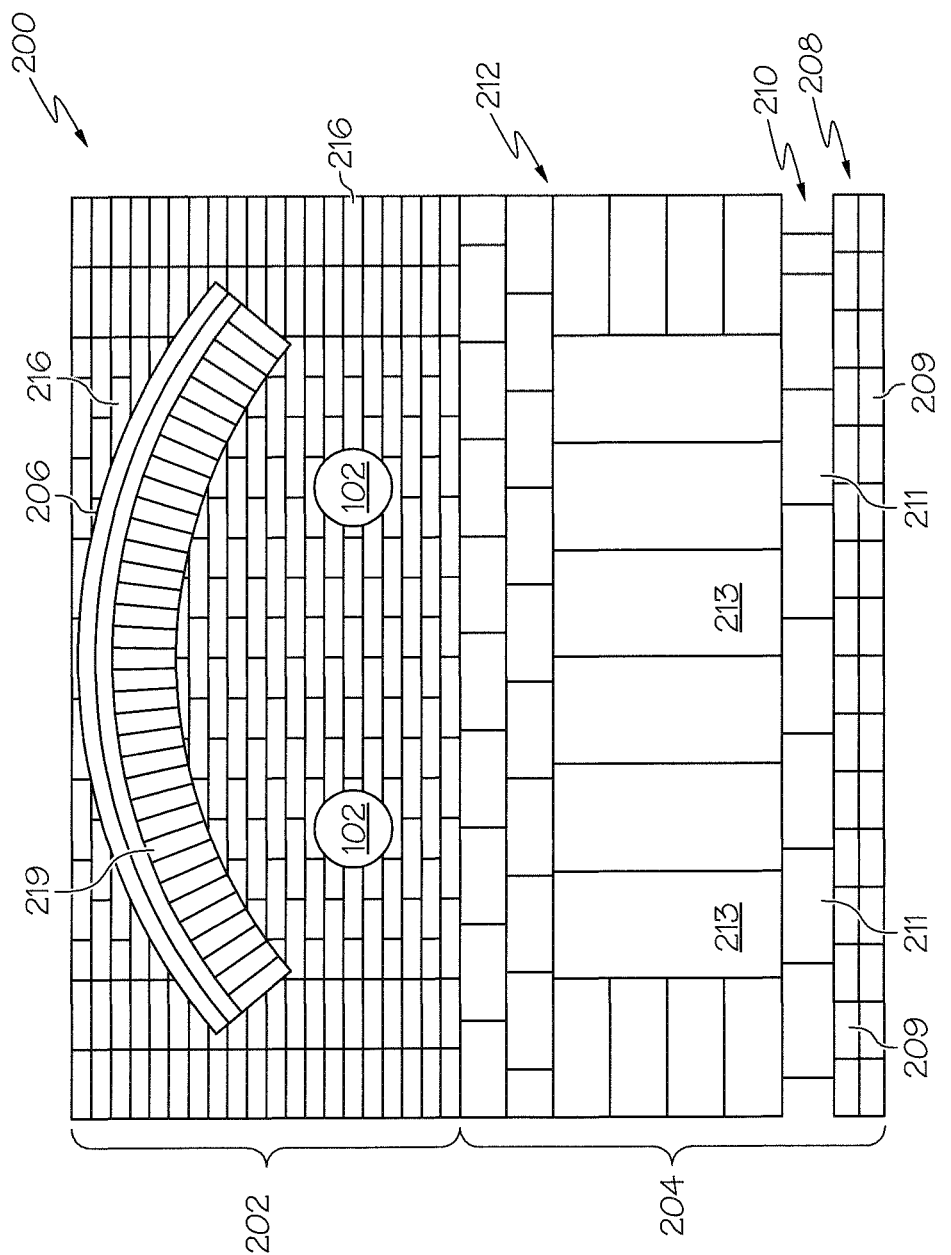
FIG. 4 schematically depicts a cross section of the tank assembly of the melter of FIG. 2 without the rigid exoskeleton.

Referring now to FIG. 4, a cross section of the tank assembly 200 of FIG. 2 is schematically depicted without the rigid exoskeleton. The cross section depicted in FIG. 4 is of the rear face 218 of the tank assembly 200. The tank assembly 200 generally comprises a glass contact portion 204 and a superstructure portion 202. The glass contact portion 204 is the lower part of the tank assembly 200 where glass batch materials are heated and turned into molten glass. The superstructure portion 202 is positioned over the glass contact portion 204 and generally includes an arched roof or crown 206. The inlet ports 102 for receiving glass batch materials to be melted in the tank assembly 200 are positioned in the superstructure portion 202.

The wall portions of the tank assembly 200 are constructed from stacked refractory blocks. The refractory blocks are formed from refractory materials such as, alumina, zirconia, or another suitable ceramic refractory material. In the embodiment of the tank assembly 200 depicted in FIG. 4, the glass contact portion 204 comprises a subfloor 208 and a floor 210. The subfloor 208 is constructed from relatively small refractory blocks 209 and the floor 210 is constructed over the subfloor 208 and comprises relatively large refractory blocks 211. In the embodiments described herein, the refractory blocks 211 of the floor 210 and the refractory blocks 209 of the subfloor 208 are laid in courses without the use of mortar in order to allow for the expansion of the refractory blocks as the tank assembly 200 is heated. The refractory blocks of the subfloor 208 and floor 210 are urged into contact with one another with pressure bolts attached to the rigid exoskeleton, as will be described in further detail herein.

In addition to the subfloor 208 and the floor 210, the glass contact portion 204 also includes at least one sidewall 212 which is also constructed from refractory blocks 213. The refractory blocks 213 of the sidewall 212 rest on either the floor 210 as shown in FIG. 4 or, alternatively, on the subfloor 208. Similar to the subfloor 208 and the floor 210, the refractory blocks 213 of the at least one sidewall 212 are assembled on the floor 210 or subfloor 208 without the use of mortar. Like the floor 210 and the subfloor 208, the refractory blocks of the sidewall 212 are urged into contact with one another with pressure bolts attached to the rigid exoskeleton.

As described above, the tank assembly 200 is utilized to heat glass batch materials and thereby form molten glass in the glass contact portion 204 of the tank assembly. Various techniques may be utilized to heat the glass contact portion 204 of the tank assembly 200. For example, in the embodiment of the tank assembly 200 depicted in FIG. 4, the tank assembly is electrically heated. In these embodiments, the glass contact portion 204 of the tank assembly 200 further comprises a plurality of electrodes 214 interspersed between the refractory blocks 213 of the at least one sidewall 212. The electrodes 214 extend through the at least one sidewall 212 and are utilized to deliver electrical energy to the molten glass and/or glass batch materials contained within the tank assembly 200. In some embodiments, the electrodes 214 may rest directly on the floor 210 of the tank assembly 200. In other embodiments the electrodes 214 may extend through the floor 210 of the tank assembly 200 and rest directly on the subfloor 208. In still other embodiments, the electrodes may be positioned in the floor 210 and/or subfloor 208. Accordingly, it should be understood that various configurations of electrodes 214 may be utilized to heat the glass contact portion 204 of the tank assembly 200.

In operation, the glass contact portion 204 of the tank assembly 200 is filled with molten glass up to a predetermined level along the sidewall 212. In order to maintain the glass in its molten state, the interior of the glass contact portion 204 must be maintained at relatively high temperatures, often in excess of 1500° C. Heat is contained in the tank assembly 200 by the superstructure portion 202. As noted above, the superstructure portion 202 is positioned over the glass contact portion 204. In the embodiments described herein, the superstructure portion 202 does not rest directly on the glass contact portion 204. Instead, the superstructure portion 202 is constructed on one or more supports (i.e., a support angle member) which, in turn, are supported by the rigid exoskeleton. However, it should be understood that, in other embodiments, the superstructure portion 202 may rest directly on the glass contact portion 204.

Still referring to FIG. 4, the superstructure portion 202 is constructed from multiple courses of refractory blocks 216. In the embodiments shown and described herein, the refractory blocks 216 are joined with a mortar formed from refractory material such as alumina, zirconia or the like. However it should be understood that the use of a refractory mortar is optional and, in some embodiments, the superstructure portion 202 is formed without the use of any mortar.

The crown 206 is also constructed from refractory blocks 219. The refractory blocks 219 of the crown 206 may be formed into the arch shape using traditional masonry techniques for forming arches and/or vaults.

In the embodiments of the melter 101 described herein, the refractory blocks are supported and reinforced by the rigid exoskeleton and attached base portion.

Figure 5:
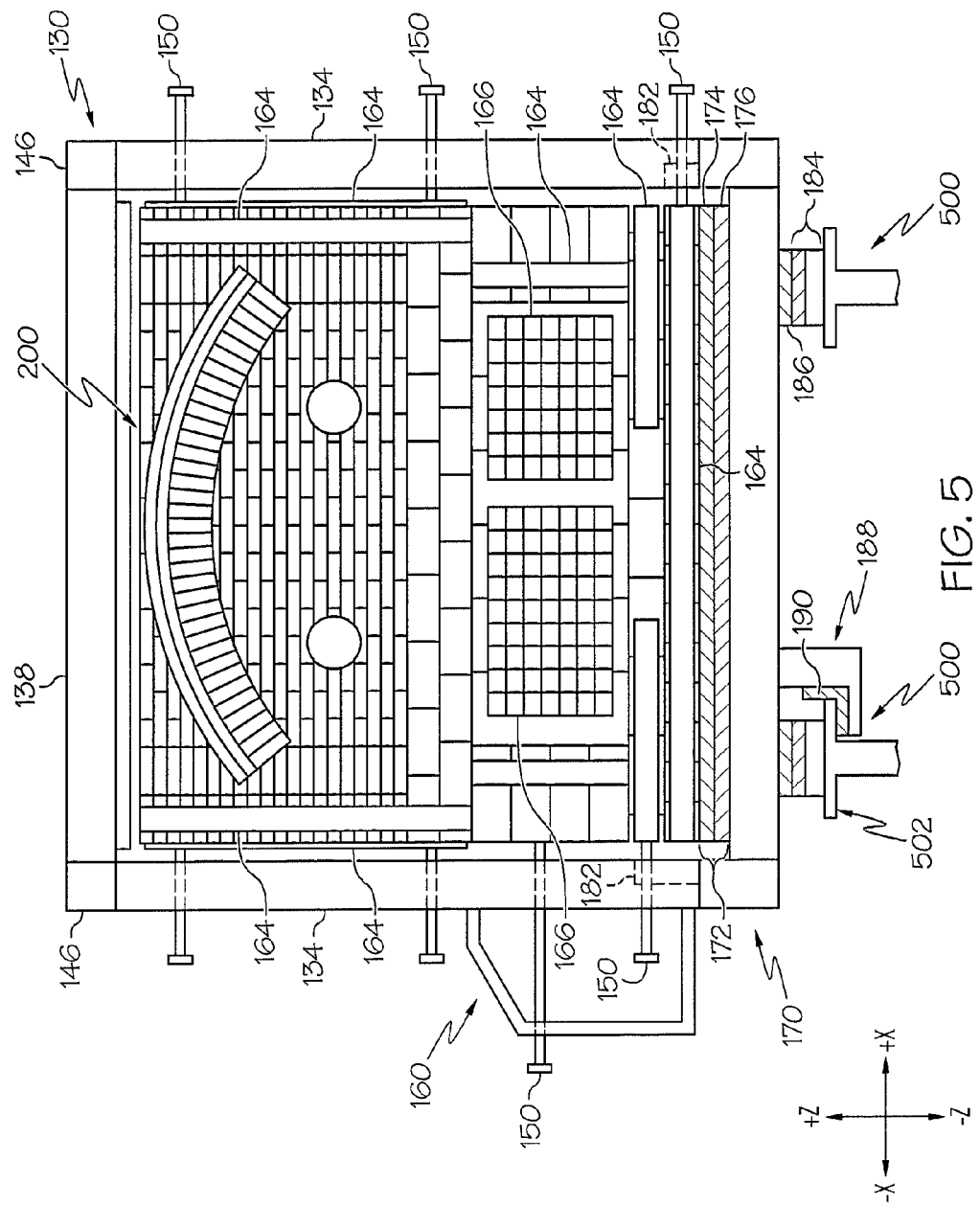
FIG. 5 schematically depicts a cross section of the melter of FIG. 2, according to one or more embodiments shown and described herein.
Figure 6:
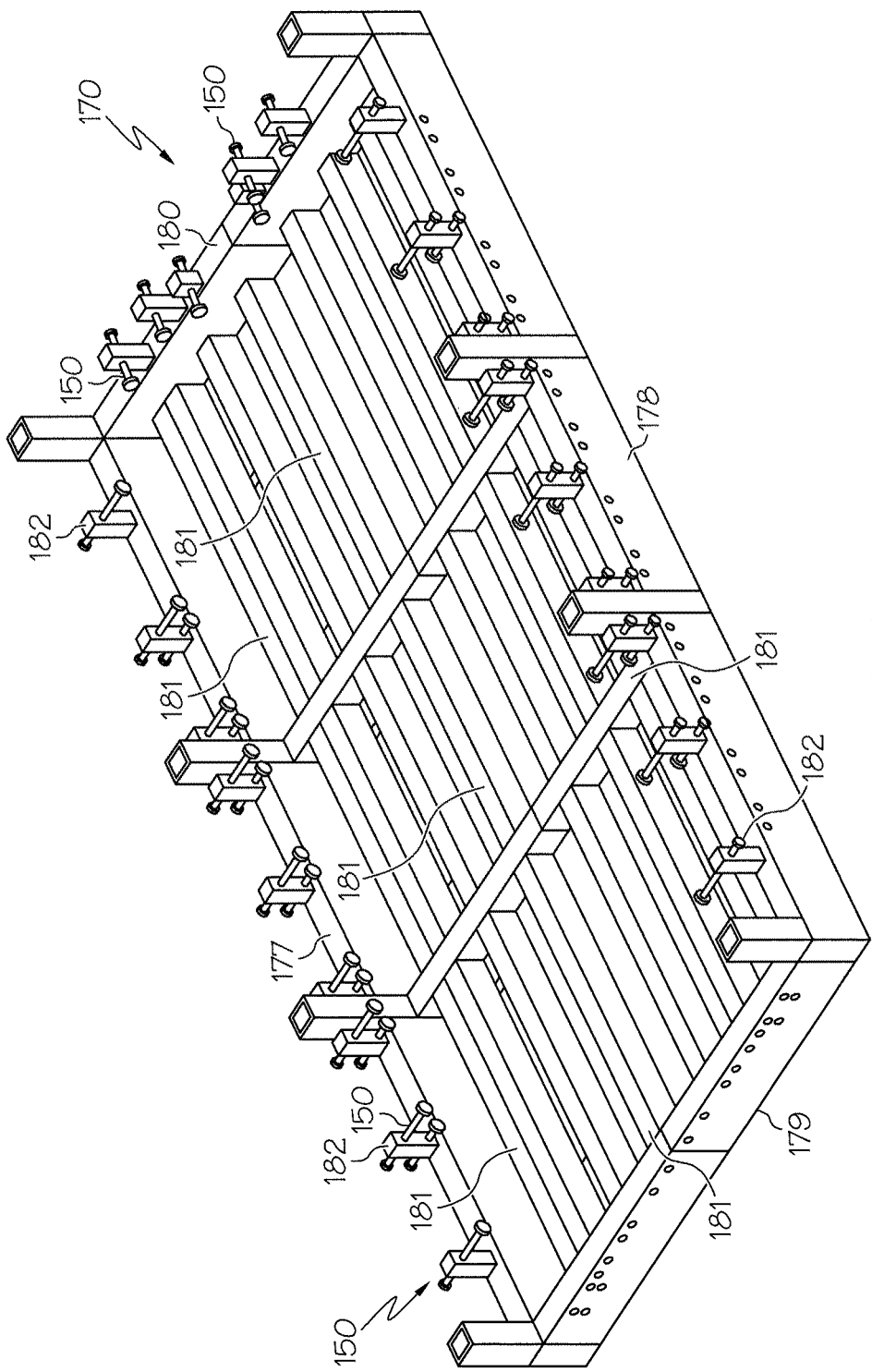
FIG. 6 schematically depicts a base portion of an exoskeleton for a melter according to one or more embodiments shown and described herein.
Figure 7:
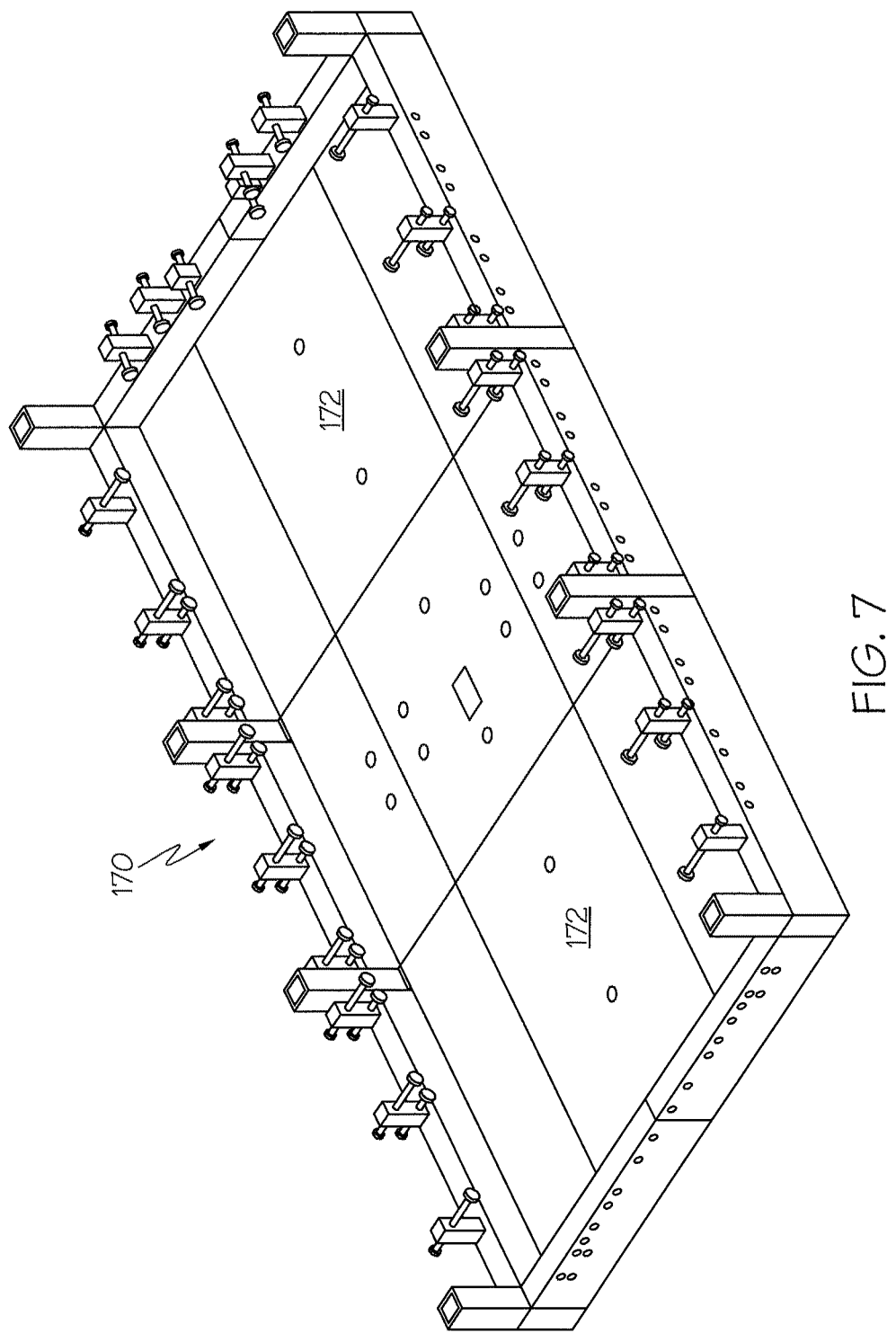
FIG. 7 schematically depicts a base portion of an exoskeleton for a melter including the isolation floor plate, according to one or more embodiments shown and described herein.

Referring now to FIGS. 5-7 by way of example, the tank assembly 200 is positioned on the base portion 170 of the exoskeleton of the melter 101. In the embodiments of the melter shown and described herein, the base portion 170 is constructed from tubular beams. Each member of the base portion may have a circular cross section, a rectangular cross section, or any other suitable closed-walled geometric shape. However, it should be understood that, in other embodiments, beams having an open geometrical cross section (i.e., I-beams) may be used to form the base portion or, alternatively, a combinations of beams with open geometrical cross sections and closed geometrical cross sections may be used to form the base portion. The base portion 170 includes longitudinal side members 177, 178 and transverse side members 179, 180 which are interconnected and form the perimeter of the base portion 170. In the embodiments of the base portion 170 depicted in FIG. 5, the longitudinal side members 177, 178 and the transverse side members 179, 180 are welded together. However, it should be understood that the longitudinal side members 177, 178 and the transverse side members 179, 180 may be coupled together with mechanical fasteners, such as bolts or the like, in addition to or as an alternative to welding. In the embodiment of the base portion 170 shown in FIGS. 5-7, the base portion 170 is generally rectangular. However, it should be understood that the base portion may be formed in other geometrical configurations such as a square or the like.

The base portion 170 of the exoskeleton further comprises a plurality of interior support members 181 which are arranged in a grid pattern and joined to one another and to the longitudinal side members 177, 178 and the transverse side members 179, 180 by welding and/or mechanical fasteners, such as bolts or the like. The interior support members 181 are formed from tubular beams, however, each member of the base portion may have a circular cross section, a rectangular cross section, or any other suitable open or closed geometric shape. In some embodiments, multiple interior support members are positioned in close proximity to or in direct contact with one another along the longitudinal side members to provide increased support for the sidewalls of the tank assembly 200.

The base portion 170 may further comprise a plurality of stub brackets 182. The stub brackets 182 may be formed from sections of tubular beam and are attached to the longitudinal side members 177, 178 and the transverse side members 179, 180 by welding and/or mechanical fasteners. Pressure bolts 150 are positioned in the stub brackets 182 such that the pressure bolts can engage with the refractory blocks of the floor and subfloor of the tank assembly 200 and thereby urge the refractory blocks into contact with one another.

Stiller referring to FIGS. 5-7, the base portion 170 also includes at least one isolation floor plate 172 which is positioned on the grid formed by the interior support members 181. The isolation floor plate 172 generally comprises a metallic top plate 174 formed from steel or a similar structural metal and a lower insulating plate 176. The lower insulating plate 176 may be formed from an electrically insulating material such that the tank assembly 200 is electrically isolated from the base portion 170. Electrically isolating the base portion 170 from the tank assembly 200 prevents the base portion from becoming electrically charged in the event that the floor and/or subfloor of the tank assembly 200 is compromised and electrically charged molten glass escapes from the tank assembly 200 on to the base portion. Suitable material for forming the lower insulating plate 176 includes, without limitation, calcium silicate board such as CS85 manufactured by BNZ Materials, Inc. However, it should be understood that the lower insulating plate 176 may be formed from other, similar electrically insulating materials.

In some embodiments, the at least one isolation floor plate 172 may include a plurality of isolation floor plates as schematically depicted in FIG. 7. The plurality of isolation floor plates may be positioned on the base portion 170 such that each individual isolation floor plate 172 is electrically isolated from adjacent isolation floor plates. For example, in some embodiments, each individual isolation floor plate of the plurality of isolation floor plates is spaced apart from adjacent isolation floor plates to electrically isolate adjacent isolation floor plates from one another. This arrangement prevents all the isolation floor plates from becoming electrically charged in the event that electrically charged molten glass leaks on to one single electrical isolation floor plate.

Referring to FIG. 5, the base portion 170 may also include a plurality of rollers 184 (one shown in FIG. 5) which are attached to the underside of the base portion 170. The rollers 184 facilitate positioning the melter relative to fining vessel and other downstream processing equipment in the glass manufacturing apparatus. Specifically, when the melter is installed in the glass manufacturing apparatus, the melter is positioned directly on structural members of the building, such as an I-beam 500 or the like. The rollers 184 facilitate moving the melter along the structural member to facilitate alignment of the melter with the fining vessel, particularly as the melter is heated and expands. In the embodiments of the melter described herein, the rollers 184 are electrically isolated from the base portion 170 to prevent the rollers 184 and the structural member from becoming electrically charged in the event that electrically charged molten glass leaks from the tank assembly 200 and onto the base portion 170. In some embodiments, electrical isolation of the rollers from the base portion 170 is accomplished by positioning electrical insulation 186 between the base portion 170 and the roller 184. Suitable electrical insulation includes, without limitation, calcium silicate board such as CS85 manufactured by BNZ Materials, Inc. However, it should be understood that other electrically insulating materials may be used.

Still referring to FIG. 5, the base portion 170 of the exoskeleton further comprises one or more motion restraints 188 (one shown in FIG. 5) which restrain the exoskeleton from movement in the vertical and/or horizontal directions. The motion restraints 188 are attached to the underside of the base portion 170, such as by welding and/or mechanical fasteners, and couple the melter to a structural member (such as an I-beam 500 or the like) and/or a structural slab of the building in which the melter is installed. The motion restraints 188 prevent the melter from being vertically and horizontally displaced (i.e., in the +/−z, +/−y and +/−x directions) with respect to the building during a seismic episode. Accordingly, during a seismic episode, the position of the melter fluctuates with the building structure in which it is installed thereby reducing the potential for damage to the melter including, without limitation, displacement of the tank assembly relative to the rigid exoskeleton.

In the embodiments of the melter described herein, the motion restraints 188 are formed from structural steel welded to the underside of the base portion 170. The motion restraints are oriented to complement the flange portion 502 of the I-beam 500 without the structural steel of the motion restraint contacting the I-beam (i.e., the motion restraints 188 are electrically isolated from the I-beam). In order to complete the physical connection between the motion restraint 188 and the I-beam 500, the motion restraint further includes electrical insulation 190 positioned between the motion restraint 188 and the I-beam 500 such that the motion restraint 188 and the I-beam are physically coupled to one another and electrically isolated from one another. In the embodiments of the melter described herein, the motion restraints 188 are engaged with the I-beams of the building after the melter has been generally aligned with the fining vessel and heated to temperature (i.e., when the melter is in an "installed condition") at which point the electrical insulation 190 is wedged between the motion restraints 188 and the I-beam 500 completing the physical connection between the melter and the structural members of the building in which the glass manufacturing apparatus is installed. While the motion restraints 188 are depicted in FIG. 5 as being coupled to a structural steel member of the building, it should be understood that, in other embodiments (not shown) the motion restraints may be coupled to another structural element of the building, such as a concrete slab or the like.

Figure 8:
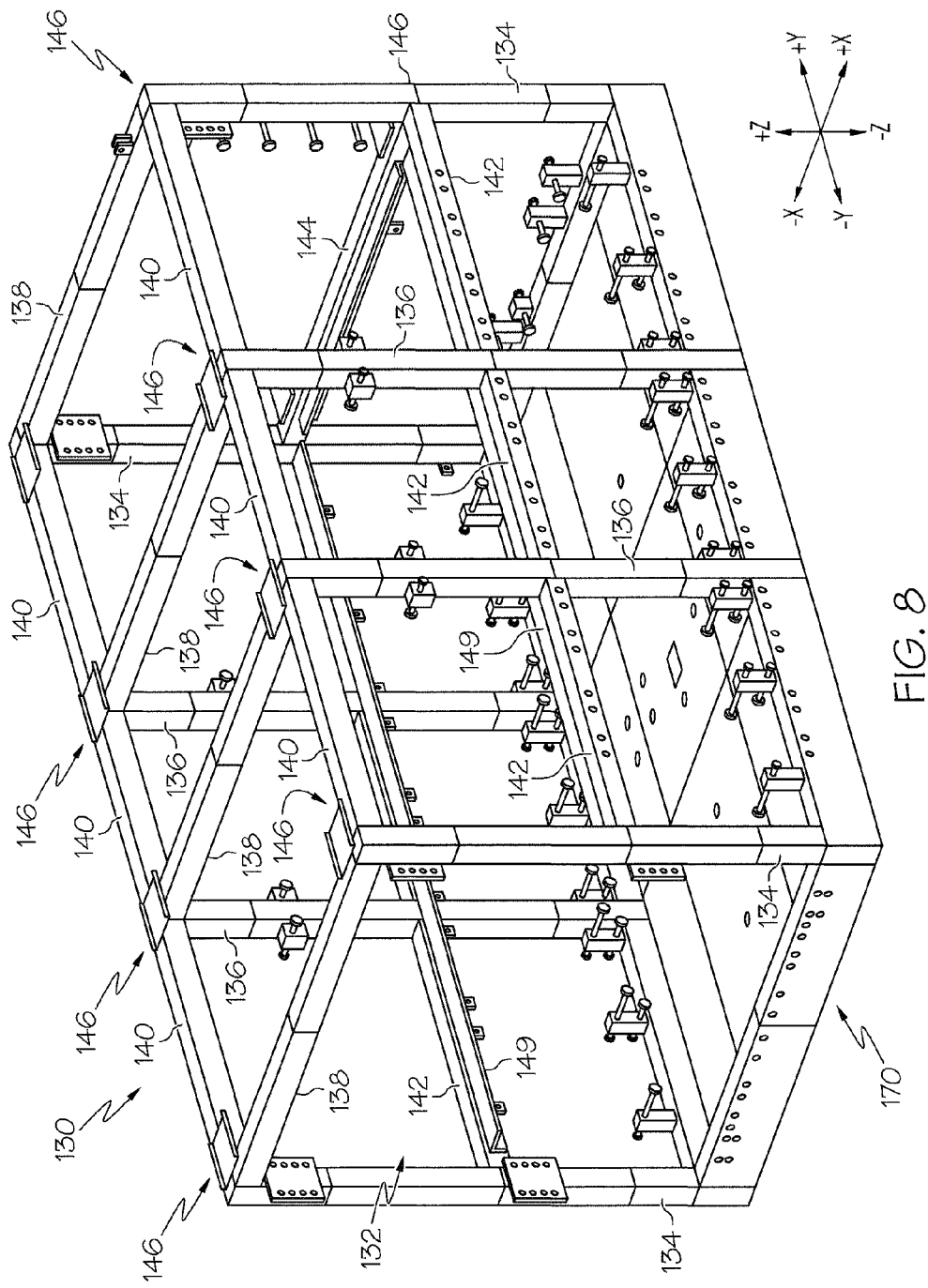
FIG. 8 schematically depicts a rigid exoskeleton for a melter according to one or more embodiments shown or described herein.

Referring now to FIGS. 5 and 8, the rigid exoskeleton 130 is rigidly coupled to the base portion 170 and generally comprises a plurality of upright members (such as a plurality of primary upright members 134 and a plurality of secondary upright members 136) and a plurality of cross members (such as a plurality of transverse cross members 138, one or more mid transverse cross members 144, a plurality of upper longitudinal cross members 140, and a plurality of mid longitudinal cross members 142). In the embodiments described herein the plurality of upright members are interconnected with the plurality of cross members to form the rigid exoskeleton 130 which encloses an exoskeleton interior volume 132. The plurality of upright members 134, 136, the plurality of transverse cross members 138, 144 and the plurality of longitudinal cross members 140, 142 are generally formed from tubular beams, such as steel tubular beams, which improves the strength and rigidity of the exoskeleton. Each tubular beam may have a circular cross section, a rectangular cross section, or any other suitable closed-walled geometric shape. However, it should be understood that, in other embodiments, beams having an open geometrical cross section (i.e., I-beams) may be used to form the exoskeleton or, alternatively, a combination of beams with open geometrical cross sections and closed geometrical cross sections may be used to form the exoskeleton.

The plurality of upright members 134, 136 are rigidly attached to the base portion 170 by welding and/or mechanical fasteners and extend upwards from the base portion 170 in a substantially vertical direction (i.e., in the +z direction of the coordinate axes depicted in FIG. 8). In one embodiment, each of the primary upright members 134 is rigidly affixed to a corner of the base portion 170 while the secondary upright members 136 are rigidly affixed to the longitudinal side members 177, 178 of the base portion between the primary upright members 134. The plurality of cross members 138, 140, 142, 144 extend between the upright members 134, 136 and are rigidly attached to the upright members 134, 136, such as by welding and/or mechanical fasteners.

In the embodiments described herein, at least two of the plurality of upright members are connected by the cross members at the upper ends of the upright members. For example, in some embodiments the plurality of upper longitudinal cross members 140 extend between and are rigidly affixed to the upper ends of the primary upright members 134 and the upper ends of the of the secondary upright members 136, as depicted in FIG. 8. Similarly, some of the plurality of upper longitudinal cross members 140 may extend between and are rigidly affixed to the upper ends of the secondary upright members 136 thereby connecting the upper ends of the of the secondary upright members 136, as depicted in FIG. 8. The transverse cross members 138 extend between and are rigidly affixed to the upper ends of pairs of primary upright members 134 and extend between and are rigidly affixed to the upper ends of pairs of secondary upright members 136.

In some embodiments, the mid-sections of the upright members may also be connected by longitudinal and/or transverse cross members to further increase the strength and rigidity of the rigid exoskeleton 130. For example, the mid longitudinal cross members 142 extend between and are rigidly affixed to the mid-sections of the primary upright members 134 and the mid-sections of the secondary upright members 136, as depicted in FIG. 8. Similarly, some of the plurality of mid longitudinal cross members 142 extend between and are rigidly affixed to the mid-sections of the secondary upright members 136 thereby connecting the mid-sections of the of the secondary upright members 136, as depicted in FIG. 8. The mid transverse cross members 144, when included, may extend between the mid-sections of primary upright members thereby coupling the mid-sections of the primary upright members.

The interconnection of the plurality of upright members 134, 136 by the plurality of transverse and longitudinal cross members 138, 140, 142, 144 forms a rigid exoskeleton with improved rigidity and ductility. More specifically, the intersection of the transverse cross members 138 and the upper longitudinal cross members 140 with the upper ends of the primary upright members 134 and/or the secondary upright members 136 forms a plurality of connection nodes 146 which are constrained from movement relative to the base portion in the transverse direction (i.e., +/−x), the longitudinal direction (i.e., +/−y), and the vertical direction (i.e., +/−z) thereby increasing the rigidity of the exoskeleton 130 and resisting flexing and/or buckling during seismic activity.

In embodiments where the rigid exoskeleton 130 further comprises mid transverse cross members affixed to and adjoining the mid-sections of adjacent primary upright members 134, the intersection of the primary upright members, the mid transverse cross members, and the mid longitudinal cross members creates connection nodes 146 which are similarly constrained from movement relative to the base portion in the transverse direction (i.e., +/−x), the longitudinal direction (i.e., +/−y), and the vertical direction (i.e., +/−z) thereby further increasing the rigidity and ductility of the exoskeleton 130.

Still referring to FIG. 8, the rigid exoskeleton 130 may further comprise support angle members 149 which are located in the exoskeleton interior volume 132 and affixed to the upright members 134, 136. As noted hereinabove, the superstructure portion 202 of the tank assembly may be constructed on and supported by the support angle members 149 thereby decreasing the stress on the glass contact portion 204 of the tank assembly 200.

Referring now to FIGS. 2-3, and 5, the tank assembly 200 is constructed on the isolation floor plate 172 of the base portion 170 such that the tank assembly 200 is located within the exoskeleton interior volume 132 and spaced apart from the rigid exoskeleton 130. Once the tank assembly 200 is constructed, the tank assembly is reinforced by coupling the tank assembly 200 to the rigid exoskeleton 130. In the embodiments described herein, coupling the tank assembly 200 to the rigid exoskeleton 130 is accomplished with pressure bolts 150 which are attached to the rigid exoskeleton 130.

Figure 9:
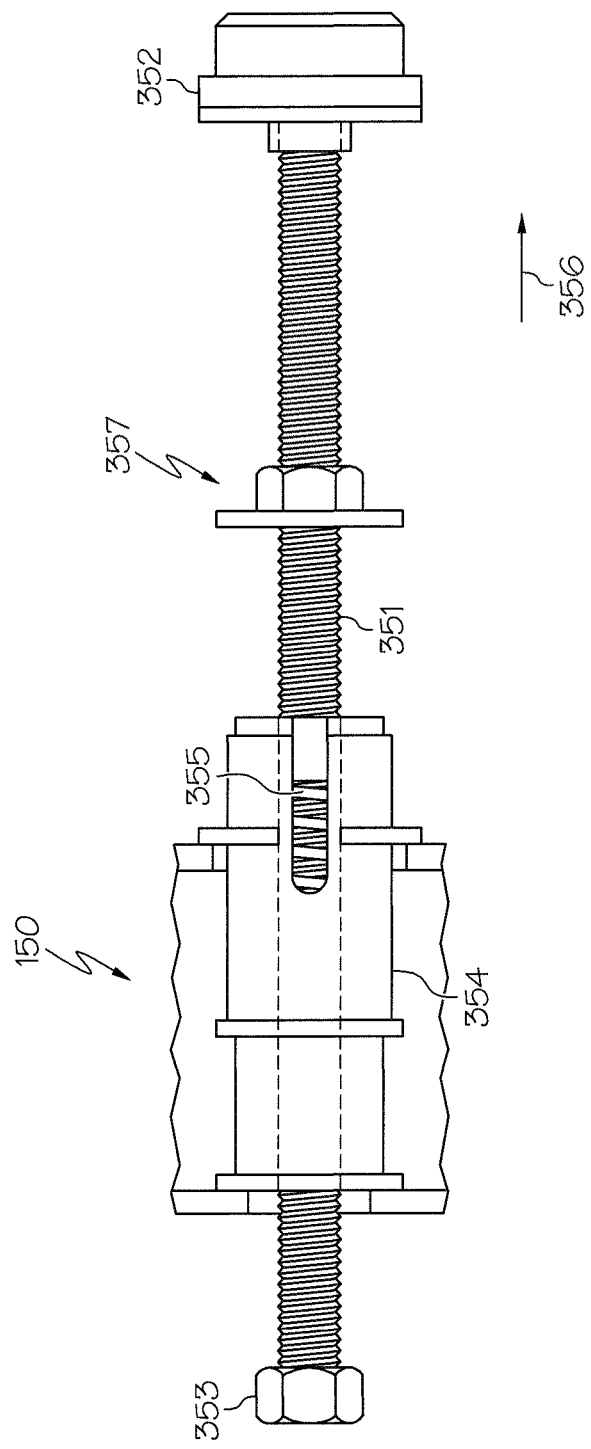
FIG. 9 schematically depicts a pressure bolt for coupling a tank assembly of the melter to the rigid exoskeleton according to one or more embodiments shown and described herein.

Referring to FIG. 9, a pressure bolt 150 is schematically depicted according to one or more embodiments shown and described herein. The pressure bolt 150 generally comprises a threaded rod 351 which extends through a body 354. The body 354 contains a plurality of disc springs 355, such as Bellville washers or the like, which bias the threaded rod in the direction indicated by arrow 356. A first end of the threaded rod 351 includes a tensioning nut 353 and the second end of the threaded rod 351 includes an engagement foot 352. The pressure bolt 150 may also include a jam nut 357 positioned on the threaded rod 351 which can be advanced against the body 354 to prevent compression of the disc springs 355.

Referring again to FIGS. 2, 3 and 5, in the embodiments described herein the pressure bolts 150 are coupled to the rigid exoskeleton 130 by positioning the pressure bolts 150 in holders that are affixed to the rigid exoskeleton 130 and/or base portion 170 by welding and/or mechanical fasteners. For example, the holders may include stub brackets 182 (as described above), stanchions 152, and/or c-frames 160. In the embodiments described herein, the pressure bolts 150 extend through the holder such that the body of each of the pressure bolts is secured in the holder and rotation of the body with respect to the holder is prevented. The holders also secure the pressure bolts 150 relative to the rigid exoskeleton 130 such that the engagement foot of each spring-loaded pressure bolt can be advanced towards the tank assembly 200.

In order to evenly distribute the force applied to the tank assembly 200 by the pressure bolts 150, support panels may be disposed between the pressure bolts 150 and the tank assembly 200. For example, in some embodiments, the support panel may comprise a plate 164 of metallic material such as steel or a similar material. The plate 164 of metallic material is positioned directly against the refractory blocks of the tank assembly 200 (as shown in FIG. 5) and the threaded rods of the pressure bolts are advanced until the engagement feet of the pressure bolts 150 contact the plate 164, thereby impinging the plate 164 between the pressure bolts 150 and the refractory blocks, as depicted in FIGS. 2 and 3.

In some other embodiments, the support panel may comprise a grill 166 of metallic material, such as steel or a similar material. In these embodiments, the grill 166 of metallic material is positioned directly against the refractory blocks of the tank assembly 200 (as shown in FIG. 5) and the threaded rods of the pressure bolts are advanced until the engagement feet of the pressure bolts 150 contact the grill 166, thereby impinging the grill 166 between the pressure bolts 150 and the refractory blocks, as depicted in FIGS. 2 and 3.

As the pressure bolts 150 are brought into engagement with the tank assembly 200, the pressure bolts exert a compressive force on the refractory blocks of the tank assembly 200 and, more particularly, on the refractory blocks of the glass contact portion of the tank assembly such that the refractory blocks are urged together and seams between adjacent blocks are closed. Simultaneously, the pressure bolts 150 rigidly couple the tank assembly 200 to the rigid exoskeleton 130 such that the tank assembly and the rigid exoskeleton move as a single, unitary assembly without the tank assembly shifting relative to the rigid exoskeleton.

Referring again to FIGS. 1-3, 5 and 9, during installation and start-up of the melter 101, the melter 101 is initially installed on the building structural members (i.e., the I-beams 500) and rolled into rough alignment with the fining vessel 103 on rollers 184. The pressure bolts 150 are also advanced towards the tank assembly 200 until the engagement feet contact the refractory blocks and/or the support plates positioned between the refractory blocks and the pressure bolts 150 which urges the refractory blocks together in both the transverse and longitudinal directions and closes any spaces between the refractory blocks. During installation and start-up, the jam nut 357 (FIG. 9) on each pressure bolt 150 is spaced apart from the body 354 to allow the disc springs 355 within the body 354 to absorb the expansion of the refractory blocks of the tank assembly 200 during heating.

Once the tank assembly 200 of the melter 101 is fully heated, the jam nuts 357 of the pressure bolts are advanced against the body 354 of each pressure bolt thereby preventing further compression of the disc springs 355 and rigidly coupling the tank assembly 200 to the rigid exoskeleton 130 such that the tank assembly does not shift with respect to the rigid exoskeleton 130 during moderate seismic episodes. In addition, the electrical insulation 190 is positioned between the motion restraints 188 and the flanges of the I-beams 500 such that the melter 101 is physically coupled to the structural members of the building and the melter 101 is in an "installed condition."

It should now be understood that the melters described herein are capable of withstanding forces, velocities, and/or accelerations of greater than 0.3 g in each of the transverse, longitudinal and vertical directions without the tank assembly shifting with respect to the rigid exoskeleton. This is achieved, in part, by coupling the tank assembly to a rigid exoskeleton in which the upper ends of the upright members are coupled to the transverse cross members and upper longitudinal cross members such that the intersection nodes are constrained relative to the base portion in each of the transverse, longitudinal, and vertical directions. In addition, the melter is constructed such that the melter can be physically coupled to the building structure in which it is installed which allows the melter to "follow" the undulations of the structure during seismic episodes.

In a first aspect, a melter for melting glass batch materials includes a rigid exoskeleton comprising a base portion and a plurality of upright members and a plurality of cross members defining an exoskeleton interior volume. The plurality of upright members are rigidly attached to the base portion and extend upwards from the base portion in a generally vertical direction. The plurality of cross members extend between and are rigidly attached to upper ends of at least two of the plurality of upright members such that the plurality of upright members are interconnected by the plurality of cross members and connection nodes formed at intersections of the plurality of cross members with the upper ends of the plurality of upright members are constrained from movement relative to the base portion in a longitudinal direction, a transverse direction, and a vertical direction. A tank assembly may be positioned on the base portion in the exoskeleton interior volume such that the tank assembly is spaced apart from the rigid exoskeleton, wherein the tank assembly is coupled to the rigid exoskeleton.

In a second aspect, a melter for melting glass batch materials includes a rigid exoskeleton rigidly defining an exoskeleton interior volume for receiving a tank assembly, the rigid exoskeleton comprising a base portion, a plurality of upright members, and a plurality of cross members formed from tubular beams. The plurality of upright members are rigidly attached to the base portion and extend upwards from the base portion in a generally vertical direction. The plurality of cross members extend between and are rigidly attached to upper ends of at least two of the plurality of upright members such that the plurality of upright members are interconnected by the plurality of cross members and connection nodes formed at intersections of the plurality of cross members with the upper ends of the plurality of upright members are constrained from movement relative to the base portion in a longitudinal direction, a transverse direction, and a vertical direction. A plurality of pressure bolts affixed to the rigid exoskeleton for coupling the tank assembly to the rigid exoskeleton when the tank assembly is positioned in the exoskeleton interior volume. Rollers may be affixed to an underside of the base portion. The rollers may be electrically isolated from the base portion. A motion restraint may be attached to the underside of the base portion for affixing the melter to a building structural member when the melter is in an installed condition.

In a third aspect, a melter for melting glass batch materials includes a rigid exoskeleton including a base portion and a plurality of upright members interconnected with a plurality of cross members and the base portion. The rigid exoskeleton defines an exoskeleton interior volume. A tank assembly may be positioned on the base portion in the exoskeleton interior volume and coupled to the rigid exoskeleton. The melter has a dynamic resistance greater than 0.3.

In a fourth aspect, the melter of any of the first or second aspects has a dynamic resistance greater than 0.3.

A fifth aspect includes the melter of any of any of the first through fourth aspects wherein the plurality of upright members and the plurality of cross members are formed from tubular beams.

A sixth aspect includes the melter of any of the first through fifth aspects wherein the base portion is substantially rectangular and the plurality of upright members comprise a plurality of primary upright members and a plurality of secondary upright members. Each primary upright member is rigidly affixed to a corner of the base portion and the plurality of secondary upright members are rigidly affixed to the base portion between primary upright members. The plurality of cross members comprise a plurality of upper longitudinal cross members, a plurality of mid longitudinal cross members, and a plurality of transverse cross members. The plurality of upper longitudinal cross members are rigidly affixed to the upper ends of the primary upright members and upper ends of secondary upright members. The plurality of mid longitudinal cross members are rigidly affixed to mid-sections of the primary upright members and the secondary upright members. The plurality of transverse cross members are rigidly affixed to upper ends of pairs of primary upright members and to upper ends of pairs of secondary upright members.

A seventh aspect includes the melter of any of the first through sixth aspects wherein the base portion is electrically isolated from the tank assembly by at least one isolation floor plate.

An eighth aspect includes the melter of the seventh aspect wherein the at least one isolation floor plate comprises a plurality of isolation floor plates and each individual isolation floor plate is electrically isolated from adjacent isolation floor plates.

A ninth aspect includes the melter of the first or third through eighth aspects further comprising rollers affixed to an underside of the base portion.

A tenth aspect includes the melter of the ninth aspect wherein the rollers are electrically isolated from the base portion.

An eleventh aspect includes the melter of the second or ninth through tenth aspects, further comprising electrical insulation positioned between the rollers and the underside of the base portion such that the rollers are electrically isolated from the base portion.

An twelfth aspect includes the melter of the first or third through eleventh aspects, further comprising a motion restraint attached to an underside of the base portion for affixing the melter to a building structural member when the melter is in an installed condition.

A thirteenth aspect includes the melter of the twelfth aspect, wherein the motion restraint is electrically isolated from the building structural member when the melter is in an installed condition.

A fourteenth aspect includes the melter of any one of the first through sixth aspects or eighth through thirteenth aspects further comprising at least one isolation floor plate positioned between the base portion and the tank assembly such that the base portion is electrically isolated from the tank assembly, wherein the at least one isolation floor plate comprises a metallic top plate and a lower insulating plate.

A fifteenth aspect includes the melter of the fourteenth aspect wherein the at least one isolation floor plate comprises a plurality of individual isolation floor plates, wherein each individual isolation floor plate is spaced apart from adjacent isolation floor plates such that each individual isolation floor plate is electrically isolated from adjacent isolation floor plates.

A sixteenth aspect includes the melter of any of the first through seventeenth aspects wherein the tank assembly comprises a glass contact portion and a superstructure portion.

A seventeenth aspect includes the melter of the sixteenth aspect wherein the glass contact portion is coupled to the rigid exoskeleton with pressure bolts.

An eighteenth aspect includes the melter of the seventeenth aspects wherein the pressure bolts extend through c-frames secured to the rigid exoskeleton.

A nineteenth aspect includes the melter of either the seventeenth or eighteenth aspect wherein the pressure bolts extend through stanchions secured to the rigid exoskeleton.

A twentieth aspect includes the melter of any of the sixteenth through nineteenth aspects wherein the glass contact portion of the tank assembly comprises a floor formed from refractory blocks and at least one sidewall formed from refractory blocks.

A twenty-first aspect includes the melter of any of the sixteenth through twentieth aspects wherein the glass contact portion of the tank assembly comprises a plurality of electrodes.

A twenty-second aspect includes the melter of any of the sixteenth through twenty-first aspects wherein the rigid exoskeleton further comprises at least one support angle member affixed to the upright members and the superstructure portion is supported on the at least one support angle member.

A twenty-third aspect includes the melter of any of the sixteenth through twenty-second aspects wherein the superstructure portion comprises a plurality of courses of refractory blocks.

A twenty-fourth aspect includes the melter of any of the sixteenth through twenty-third aspects wherein the superstructure portion comprises an arched crown constructed from refractory blocks.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A melter for melting glass batch materials, the melter comprising:
 a rigid exoskeleton comprising a base portion and a plurality of upright members and a plurality of cross members defining an exoskeleton interior volume, wherein:
  the plurality of upright members are rigidly attached to the base portion and extend upwards from the base portion in a generally vertical direction; and
  the plurality of cross members extend between and are rigidly attached to upper ends of at least two of the plurality of upright members such that the plurality of upright members are interconnected by the plurality of cross members and connection nodes formed at intersections of the plurality of cross members with the upper ends of the plurality of upright members are constrained from movement relative to the base portion in a longitudinal direction, a transverse direction, and a vertical direction;

at least one isolation floor plate positioned on the base portion and comprising a metallic top plate and an insulating lower plate formed from electrically insulating material; and a tank assembly positioned on the base portion in the exoskeleton interior volume such that the tank assembly is positioned on the metallic top plate of the at least one isolation floor plate and spaced apart from the rigid exoskeleton, wherein the tank assembly is coupled to the rigid exoskeleton and electrically isolated from the rigid exoskeleton by the insulating lower plate of the at least one isolation floor plate.

2. The melter of claim 1, wherein the melter has a dynamic resistance greater than 0.3.

3. The melter of claim 1, wherein the plurality of upright members and the plurality of cross members are formed from tubular beams.

4. The melter of claim 1, wherein:

the base portion is substantially rectangular;

the plurality of upright members comprise a plurality of primary upright members and a plurality of secondary upright members, wherein each primary upright member is rigidly affixed to a corner of the base portion and the plurality of secondary upright members are rigidly affixed to the base portion between primary upright members;

the plurality of cross members comprise a plurality of upper longitudinal cross members, a plurality of mid longitudinal cross members, and a plurality of transverse cross members, wherein:

the plurality of upper longitudinal cross members are rigidly affixed to the upper ends of the primary upright members and upper ends of secondary upright members;

the plurality of mid longitudinal cross members are rigidly affixed to mid-sections of the primary upright members and the secondary upright members; and the plurality of transverse cross members are rigidly affixed to upper ends of pairs of primary upright members and to upper ends of pairs of secondary upright members.

5. The melter of claim 1, wherein the at least one isolation floor plate comprises a plurality of isolation floor plates and each individual isolation floor plate is electrically isolated from adjacent isolation floor plates.

6. The melter of claim 1, further comprising rollers affixed to an underside of the base portion.

7. The melter of claim 6, wherein the rollers are electrically isolated from the base portion.

8. The melter of claim 1, further comprising a motion restraint attached to an underside of the base portion for affixing the melter to a building structural member when the melter is in an installed condition.

9. The melter of claim 8, wherein the motion restraint is electrically isolated from the building structural member when the melter is in an installed condition.

10. A melter for melting glass batch materials, the melter comprising:

a rigid exoskeleton rigidly defining an exoskeleton interior volume for receiving a tank assembly, the rigid exoskeleton comprising a base portion, a plurality of upright members, and a plurality of cross members formed from tubular beams, wherein:

the plurality of upright members are rigidly attached to the base portion and extend upwards from the base portion in a generally vertical direction; and the plurality of cross members extend between and are rigidly attached to upper ends of at least two of the plurality of upright members such that the plurality of upright members are interconnected by the plurality of cross members and connection nodes formed at intersections of the plurality of cross members with the upper ends of the plurality of upright members are constrained from movement relative to the base portion in a longitudinal direction, a transverse direction, and a vertical direction;

a plurality of pressure bolts affixed to the rigid exoskeleton for coupling the tank assembly to the rigid exoskeleton when the tank assembly is positioned in the exoskeleton interior volume;

rollers affixed to an underside of the base portion, wherein the rollers are electrically isolated from the base portion; and a motion restraint attached to the underside of the base portion affixing the melter to a building structural member when the melter is in an installed condition.

11. The melter of claim 10, further comprising at least one isolation floor plate positioned between the base portion and the tank assembly such that the base portion is electrically isolated from the tank assembly, wherein the at least one isolation floor plate comprises a metallic top plate and a lower insulating plate.

12. The melter of claim 11, wherein the at least one isolation floor plate comprises a plurality of individual isolation floor plates, wherein each individual isolation floor plate is spaced apart from adjacent isolation floor plates such that each individual isolation floor plate is electrically isolated from adjacent isolation floor plates.

13. The melter of claim 11, further comprising electrical insulation positioned between the rollers and the underside of the base portion such that the rollers are electrically isolated from the base portion.

14. The melter of claim 11, wherein the motion restraint further comprises electrical insulation positioned between the motion restraint and the building structural member when the melter is in an installed condition.

15. The melter of claim 10, wherein the pressure bolts comprises:

a body;

a threaded rod positioned in the body and having a first end and a second end;

a tensioning nut positioned on the first end of the threaded rod;

an engagement foot positioned on the second end of the threaded rod;

a jam nut positioned on the threaded rod between the body and the engagement foot; and a plurality of disk springs disposed in the body and biasing the threaded rod out of the body.

16. A melter for melting glass batch materials, the melter comprising:

a rigid exoskeleton including a base portion and a plurality of upright members interconnected with a plurality of cross members and the base portion, the rigid exoskeleton defining an exoskeleton interior volume;

at least one isolation floor plate positioned on the base portion and comprising a metallic top plate and an insulating lower plate formed from electrically insulating material; and a tank assembly positioned on the base portion on the metallic top plate of the at least one isolation floor plate in the exoskeleton interior volume and coupled to the rigid exoskeleton, wherein the tank assembly is electrically isolated from the rigid exoskeleton by the insulating lower plate of the at least one isolation floor plate and the melter has a dynamic resistance greater than 0.3.

17. The melter of claim 16, wherein connection nodes formed at intersections of the plurality of cross members with upper ends of the plurality of upright members are constrained from movement relative to the base portion in a longitudinal direction, a transverse direction, and a vertical direction.

18. The melter of claim 16, wherein the tank assembly is coupled to the rigid exoskeleton with pressure bolts.

19. The melter of claim 18, wherein the pressure bolts comprises:
   a body;
   a threaded rod positioned in the body and having a first end and a second end;
   a tensioning nut positioned on the first end of the threaded rod;
   an engagement foot positioned on the second end of the threaded rod;
   a jam nut positioned on the threaded rod between the body and the engagement foot; and
   a plurality of disk springs disposed in the body and biasing the threaded rod out of the body.

20. The melter of claim 16, further comprising rollers affixed to an underside of the base portion, wherein the rollers are electrically isolated from the base portion.

\* \* \* \* \*